US010245531B2

(12) United States Patent
Steiner et al.

(10) Patent No.: US 10,245,531 B2
(45) Date of Patent: Apr. 2, 2019

(54) HIGH-EFFICIENCY AUTOMATIC SELF-CLEANING STRAINER

(71) Applicant: TM Industrial Supply, Inc., Erie, PA (US)

(72) Inventors: Carl A. Steiner, Erie, PA (US); Ricky L. Jackson, Union City, PA (US)

(73) Assignee: TM Industrial Supply, Inc., Erie, PA (US)

( * ) Notice: Subject to any disclaimer, the term of this patent is extended or adjusted under 35 U.S.C. 154(b) by 0 days.

(21) Appl. No.: 15/184,137

(22) Filed: Jun. 16, 2016

(65) Prior Publication Data

US 2016/0367917 A1 Dec. 22, 2016

Related U.S. Application Data

(60) Provisional application No. 62/180,683, filed on Jun. 17, 2015.

(51) Int. Cl.
*B01D 29/23* (2006.01)
*B01D 29/68* (2006.01)

(52) U.S. Cl.
CPC .......... *B01D 29/23* (2013.01); *B01D 29/682* (2013.01); *B01D 29/688* (2013.01); *B01D 2201/0415* (2013.01)

(58) Field of Classification Search
None
See application file for complete search history.

(56) References Cited

U.S. PATENT DOCUMENTS

| | | | | |
|---|---|---|---|---|
| 1,944,267 A | * | 1/1934 | Rathbun | B01D 46/0065 15/304 |
| 1,977,601 A | * | 10/1934 | Winton | F16L 55/24 210/411 |
| 1,995,648 A | * | 3/1935 | Rathbun | B01D 46/0065 210/411 |
| 1,995,649 A | * | 3/1935 | Rathbun | B01D 46/0065 55/294 |
| 2,066,479 A | * | 1/1937 | MacIsaac | B01D 29/01 210/193 |

(Continued)

FOREIGN PATENT DOCUMENTS

| | | |
|---|---|---|
| CA | 1314235 C | 3/1993 |
| CA | 2586238 A1 | 10/2007 |

(Continued)

*Primary Examiner* — Robert J Popovics
(74) *Attorney, Agent, or Firm* — The Webb Law Firm

(57) ABSTRACT

A fluid strainer assembly and a method of reducing an amount of fluid used during a cleaning cycle of the fluid strainer assembly including: a body defining a chamber; a screen positioned within the chamber; and a backwash port associated with an internal portion of the screen and rotatable about a central axis to cause a tangential flow and backflow of backwash fluid in order to dislodge and remove foreign material collected on the inner surface of the screen to flow into the backwash port and exit out a discharge outlet and backwash pipe, wherein the backwash port is configured such that the area of draw is determined by the equation: i) CS×1.875×1.5≥A; and ii) A≥CS of backwash pipe, where CS represents the internal transverse area of the backwash pipe and A represents the area of draw of the backwash port.

23 Claims, 11 Drawing Sheets

(56) References Cited

U.S. PATENT DOCUMENTS

| | | | |
|---|---|---|---|
| 2,275,958 A * | 3/1942 | Hagel | B01D 35/02 210/108 |
| 2,835,390 A * | 5/1958 | King | B01D 29/25 210/411 |
| 3,017,029 A * | 1/1962 | Berninger | B01D 29/23 210/108 |
| 3,074,556 A * | 1/1963 | Rosaen | B01D 33/11 210/195.1 |
| 3,074,560 A * | 1/1963 | Kinney | B01D 33/11 210/330 |
| 3,168,467 A * | 2/1965 | Dreye | B01D 29/23 210/108 |
| 3,256,995 A * | 6/1966 | Schmid | B01D 29/071 210/411 |
| 3,357,566 A * | 12/1967 | Schmid | B01D 29/118 210/333.01 |
| 3,574,509 A * | 4/1971 | Zentis | B01D 29/23 210/107 |
| 3,757,496 A * | 9/1973 | Berg | B01D 46/0013 55/293 |
| 3,784,016 A * | 1/1974 | Akiyanna | B01D 29/114 210/333.1 |
| 3,887,344 A * | 6/1975 | Smith | B01D 46/0065 285/405 |
| 4,643,828 A * | 2/1987 | Barzuza | B01D 29/23 210/412 |
| 4,702,847 A * | 10/1987 | Fux | B01D 21/0012 210/798 |
| 4,780,151 A * | 10/1988 | Barzuza | B01D 29/031 134/21 |
| 4,818,402 A | 4/1989 | Steiner et al. | |
| 4,867,879 A * | 9/1989 | Muller | B01D 29/035 210/392 |
| 4,875,913 A * | 10/1989 | Barzuza | B01D 29/031 55/294 |
| 4,898,671 A * | 2/1990 | Fux | B01D 21/0012 210/333.01 |
| 5,128,029 A * | 7/1992 | Herrmann | B01D 29/05 210/107 |
| 5,152,891 A | 10/1992 | Netkowicz et al. | |
| 5,164,079 A * | 11/1992 | Klein | B01D 29/117 210/186 |
| 5,268,095 A * | 12/1993 | Barzuza | B01D 29/01 210/143 |
| 5,275,728 A * | 1/1994 | Koller | B01D 29/117 210/391 |
| 5,401,396 A * | 3/1995 | Lescovich | B01D 29/118 210/108 |
| 5,443,726 A | 8/1995 | Steiner et al. | |
| 5,549,825 A * | 8/1996 | Barzuza | B01D 29/232 210/411 |
| 5,587,074 A * | 12/1996 | Lynch | B01D 29/23 210/411 |
| 5,595,655 A | 1/1997 | Steiner et al. | |
| 5,632,903 A * | 5/1997 | Caracciolo, Jr. | B01D 29/117 210/333.01 |
| 5,674,392 A * | 10/1997 | Christophe | B01D 29/23 210/259 |
| 5,728,297 A * | 3/1998 | Koller | B01D 29/23 210/407 |
| 6,103,132 A * | 8/2000 | Seyfried | B01D 33/073 210/791 |
| 6,337,013 B1 * | 1/2002 | Koopmans | B01D 29/23 210/232 |
| 6,360,896 B1 * | 3/2002 | Schildmann | B01D 29/014 210/411 |
| 6,497,815 B1 * | 12/2002 | Koller | B01D 29/014 210/130 |
| 6,543,624 B1 * | 4/2003 | Geisbauer | B01D 29/15 210/411 |
| 6,572,763 B2 * | 6/2003 | Gorshing | B01D 29/115 210/159 |
| 7,258,238 B2 * | 8/2007 | Raghupathy | B01D 29/35 210/411 |
| 7,981,282 B2 | 7/2011 | Steiner et al. | |
| 8,303,826 B2 | 11/2012 | Steiner et al. | |
| 8,496,117 B2 * | 7/2013 | Leath, III | B01D 33/11 210/373 |
| 8,524,075 B1 * | 9/2013 | Quintel | B01D 29/232 210/108 |
| 8,608,955 B2 | 12/2013 | Steiner et al. | |
| 8,852,445 B2 * | 10/2014 | Xia | B01D 29/39 210/333.01 |
| 8,945,379 B2 * | 2/2015 | Brull | B01D 29/009 210/167.12 |
| 9,061,226 B2 * | 6/2015 | Love | B01D 33/073 |
| 9,561,454 B2 * | 2/2017 | Browning | B01D 29/035 |
| 2004/0094470 A1 * | 5/2004 | Jackson | A01K 63/045 210/411 |
| 2004/0112846 A1 * | 6/2004 | Jackson | A01K 63/045 210/798 |
| 2004/0238435 A1 * | 12/2004 | Olson | B01D 29/117 210/413 |
| 2008/0047885 A1 * | 2/2008 | Shiekelmacher | B01D 29/23 210/107 |
| 2012/0223028 A1 * | 9/2012 | Dagan | B08B 5/04 210/791 |
| 2013/0087495 A1 * | 4/2013 | Riggers | B01D 29/6476 210/415 |
| 2014/0097145 A1 * | 4/2014 | Browning | B01D 29/035 210/780 |
| 2014/0116965 A1 * | 5/2014 | Cote | B01D 33/11 210/784 |
| 2016/0367917 A1 * | 12/2016 | Steiner | B01D 29/23 |

FOREIGN PATENT DOCUMENTS

| | | |
|---|---|---|
| CA | 2678316 A1 | 3/2010 |
| CA | 2697697 A1 | 9/2010 |

* cited by examiner $$CS = \pi\left(\frac{ID^2}{4}\right)$$

Appendix A
Showing "A"

The area of draw of the backwash port — Length of B/W port * Leading Edge Slot + Open Area of Screen in front of the port.

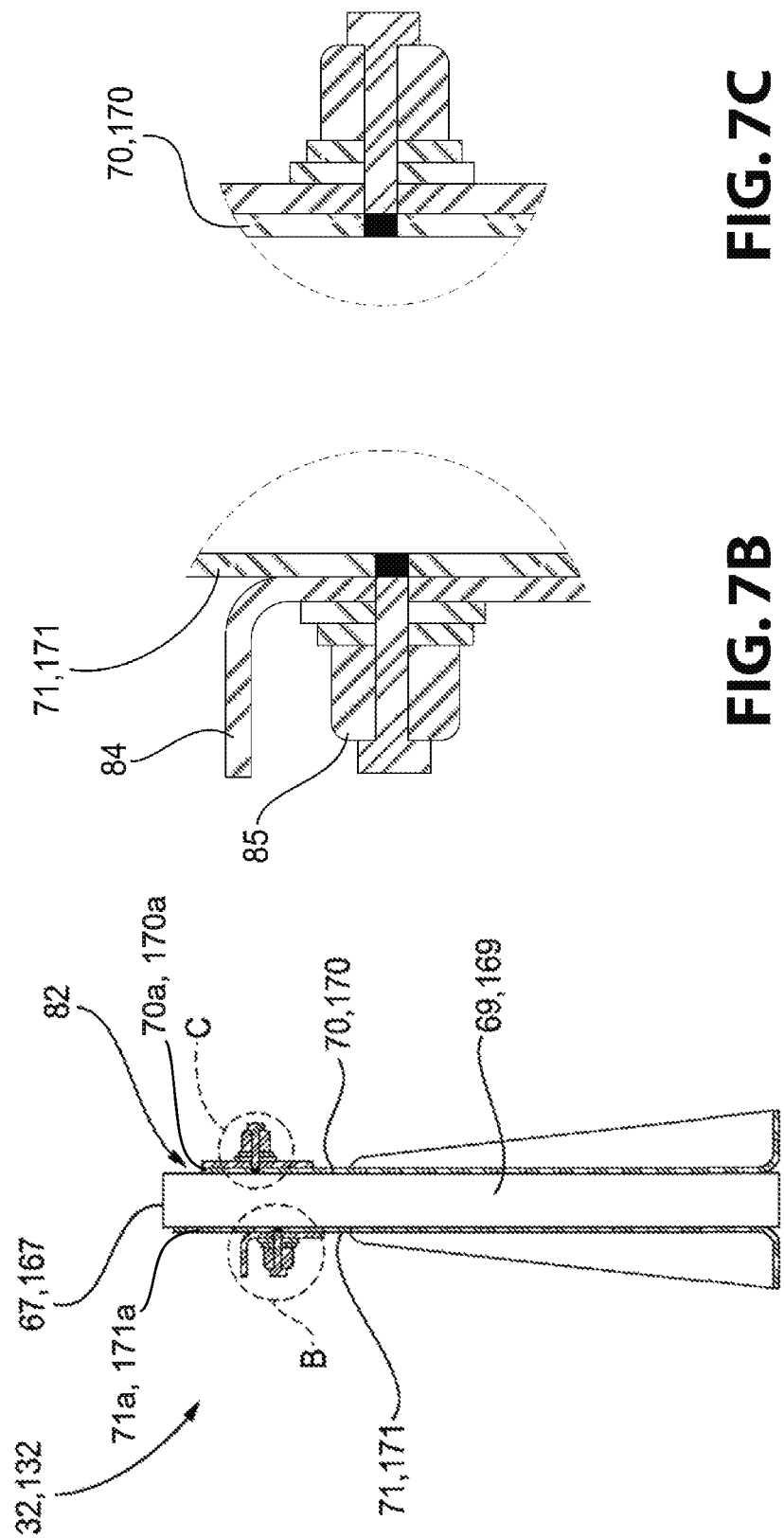

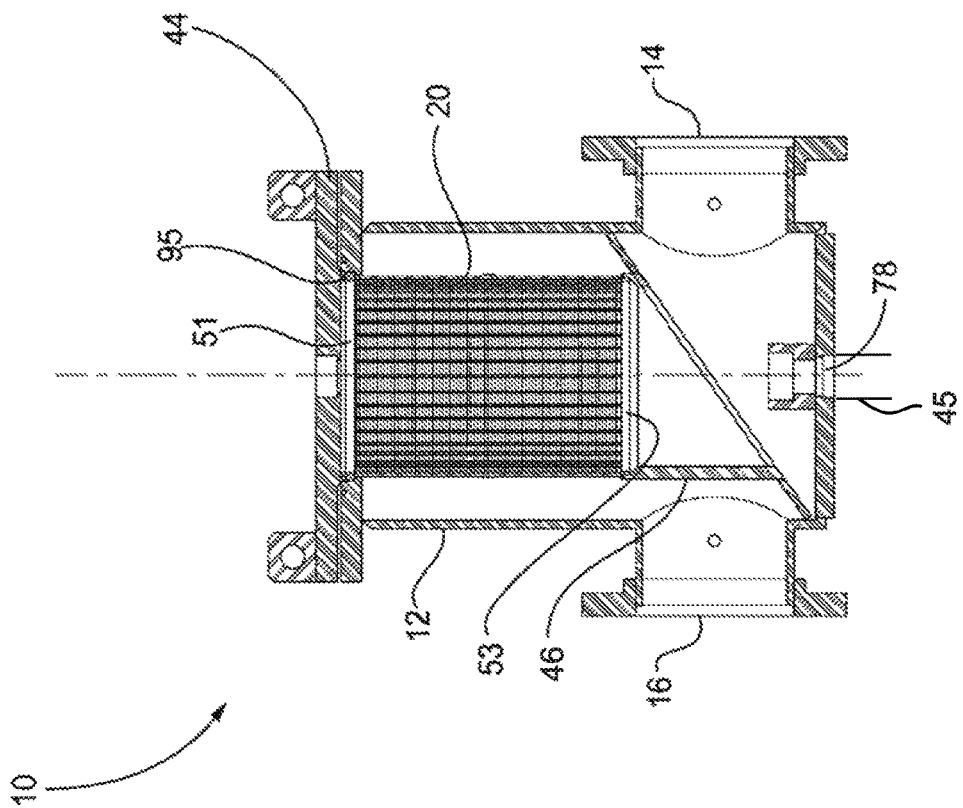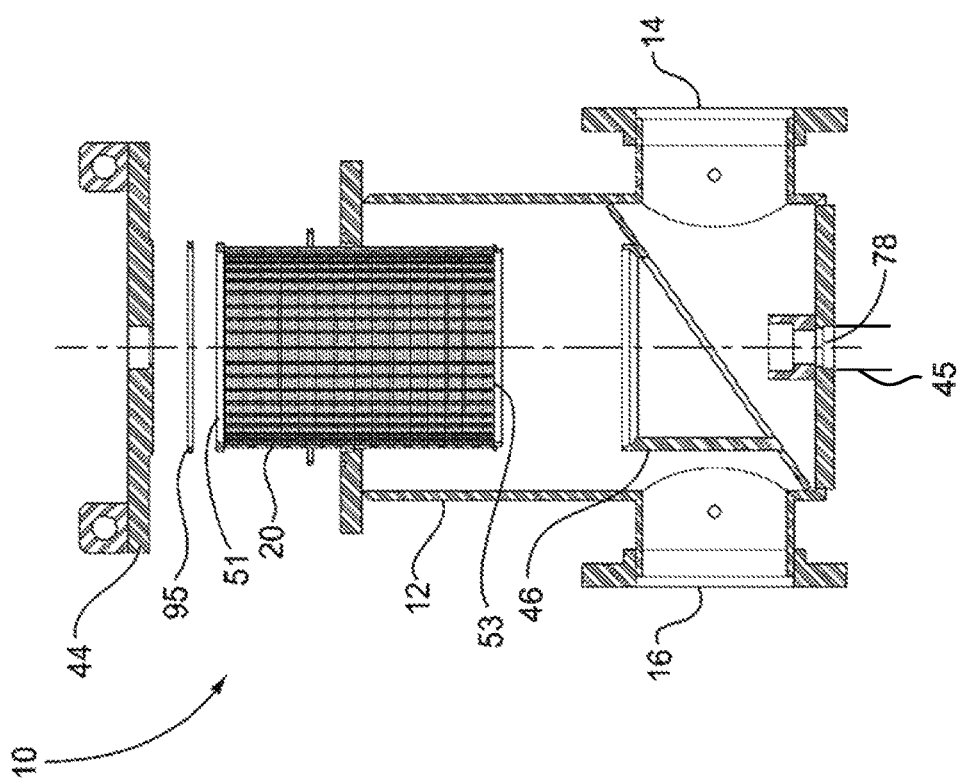

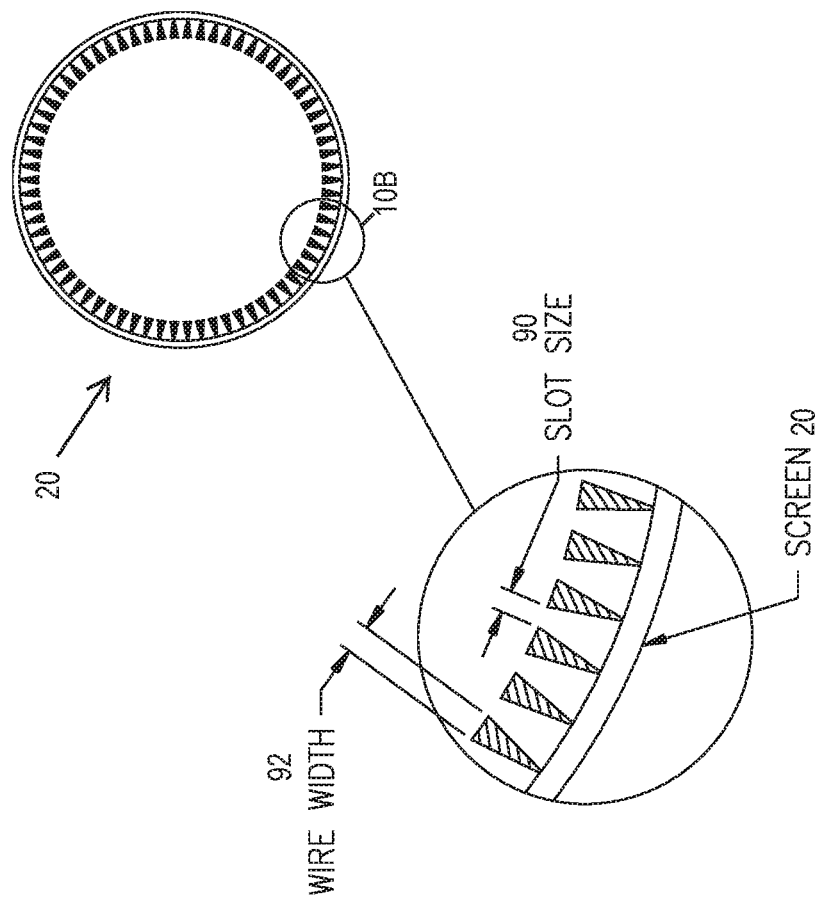

HIGH-EFFICIENCY AUTOMATIC SELF-CLEANING STRAINER

CROSS REFERENCE TO RELATED APPLICATIONS

This application claims priority to provisional U.S. Application No. 62/180,683, filed Jun. 17, 2015, entitled "High Efficiency Automatic Self-Cleaning Strainer", the disclosure of which is incorporated herein by reference in its entirety.

BACKGROUND OF THE INVENTION

Field of the Invention

The present invention is directed to automatic self-cleaning strainer assemblies which include a backwash cleaning system to remove debris from the screen and, more particularly, to automatic self-cleaning strainer assemblies which utilize a reduced amount of fluid during the backwash cleaning cycle.

Description of Related Art

Strainers and filters are employed to separate solids from fluids. The solids are collected on screening media or screens and, thereafter, the solids are removed from the screening media by backwashing. During backwashing, a portion of the fluid being strained is caused to flow tangentially across and in a reverse direction through the screen into a backwash port to clean the media, as described, for example, in U.S. Pat. Nos. 4,818,402, 5,152,891, and 5,595,655, the entirety of which are hereby incorporated by reference. As used herein, the term backwash port refers to a suction chamber, collection duct, or backwash port.

Typically, these types of strainers are installed on the discharge side of pumps which have operating pressures usually in excess of 10 psig with the backwash ports discharging to atmospheric pressure. These high differential pressures may be effectively used to backwash self-cleaning strainers. High differential pressures result in high fluid velocities across the screen in the backwashing mode of operation. The high fluid velocities remove debris collected on the screen. However, in applications which require the screen on the suction side of the system, due to space limitations and/or for pump protection, the differential pressure available may only be 5 psig or less. This normally is an insufficient pressure differential to effectively clean the screen. In some low pressure applications, an external source of backwash cleaning fluid can be applied to clean the screen and then removed via a backwash collection arrangement.

Although these backwashing methods are effective in removing the debris from the screen, whether the backwashing cycle uses the fluid being strained or clean, high pressure fluid, or a combination of both, these methods typically require a large amount of the cleaning fluid, usually 3-7% of the total fluid flows through the unit. This represents an excessive use of fluid which ultimately exits the device and is lost through the backwash cleaning arrangement.

SUMMARY OF THE INVENTION

The present disclosure is directed to an improved automatic self-cleaning fluid strainer assembly for straining media which includes a backwash cleaning system to remove debris from the strainer which reduces the amount of fluid used during the backwash cleaning cycle.

In accordance with an aspect of the invention, a fluid strainer assembly includes a body defining a chamber, a cylindrical screen positioned within the chamber and supported by the body through which a fluid being filtered must pass, wherein the body includes an inlet and an outlet, and a backwash port associated with an internal portion of the screen. The backwash port includes a rectangular member having an axially extending port defined by a top wall, a bottom wall, and a pair of parallel sidewall members having end portions. The backwash port is movable about a central axis such that the end portions of the walls defining the backwash port are in a close spaced proximity relationship with respect to an inner surface of the screen defining a space for the fluid being filtered to flow between the end portions of the walls defining the backwash port and the cylindrical surface, causing a tangential flow and backflow of the fluid in order to dislodge and remove foreign material collected on the inner surface of the screen to flow into the backwash port and exit out a discharge outlet. The backwash port is configured such that the area of draw is determined by the equations: i) $CS \times 1.875 \times 1.5 \geq A$; and ii) $A \geq CS$ of backwash pipe, where CS represents the internal transverse area of the backwash pipe and A represents the area of draw of the backwash port. The area of draw of the backwash port is defined as the leading edge area plus the screen open area that is being cleaned.

According to one embodiment, the amount of fluid exiting through the backwash port can be determined by the configuration of the backwash port according to the equation and wherein the port is configured to produce a flow rate of approximately 1.5-2% of the total amount of the fluid being filtered, wherein the fluid being filtered has a pipeline velocity of 10 ft/s. Additionally, the design of the backwash port can be determined based upon the equation determining the area of draw of the backwash port so as to produce the flow rate of 1.5-2% of the total amount of the fluid being filtered, wherein the fluid being filtered has a pipeline velocity of 10 ft/s. The screen can have a screen slot size of approximately 25-812 microns.

According to one embodiment, the backwash port can include a gear reducer for reducing a speed at which the backwash port rotates about the central axis to within the ratio of 800:1 to 1500:1. Also, the backwash port can rotate at the rate of approximately 1-2 revolutions about the inner surface of the screen per minute.

The pair of parallel sidewall members of the backwash port that form the space for the fluid being filtered can include a leading edge and a trailing edge wherein the leading edge forms a slot with respect to the inner surface of the screen. This slot can be approximately ⅛ inch.

At least one gasket can be associated with at least one of a top portion and a bottom portion of the screen to seal at least one of the top portion and bottom portion of the screen. According to one embodiment, a gasket can be associated with both the top portion and the bottom portion of the screen.

According to one embodiment, a cleaning nozzle can be provided for directing a cleaning fluid to the inner surface of the screen for dislodging foreign material from the inner surface of the screen. The cleaning nozzle can be associated with the backwash port so that the cleaning fluid and foreign material are directed to flow into the backwash port and exit out the discharge outlet.

In accordance with another aspect of the invention, a method of reducing an amount of fluid used during a cleaning cycle of a fluid strainer assembly includes providing a body defining a chamber, positioning a cylindrical screen within the chamber, wherein the screen is supported by the body through which a fluid being filtered must pass, and the body includes an inlet and an outlet. The method further includes associating a backwash port with an internal portion of the screen. The backwash port comprises a rectangular member having an axially extending port defined by a top wall, a bottom wall, and a pair of parallel sidewall members having end portions. The method also includes supplying a fluid to be filtered into the chamber, rotating the backwash port about a central axis such that the end portions of the walls defining the backwash port are in a close spaced proximity relationship with respect to an inner surface of the screen defining a space for the fluid being filtered to flow between the end portions of the wall defining the backwash port and the inner surface causing a tangential flow and backflow of the fluid in order to dislodge and remove foreign material collected on the inner surface of the screen to flow into the backwash port and exit out a discharge outlet. The method further includes configuring the backwash port such that the area of draw is determined by the equation: i) CS×1.875×1.5≥A; and ii) A≥CS, where CS represents the internal transverse area of the backwash pipe and A represents the area of draw of the backwash port. The area of draw of the backwash port is defined as the leading edge area plus the screen open area that is being cleaned.

The method also includes rotating the backwash port at a predetermined speed and configuring the size of the port of the backwash port such that the amount of fluid exiting through the backwash port has a flow rate of approximately 1.5-2% of the total amount of the fluid being filtered, wherein the fluid being filtered has a pipeline velocity of 10 ft/s. The screen can be provided as having a screen slot size of approximately 25-812 microns.

According to one embodiment, the method includes rotating the backwash port at a speed of approximately 800:1 to 1500:1, and at a rate of approximately 1-2 revolutions about the inner surface of the screen per minute. At least one gasket can be associated with at least one of a top portion and a bottom portion of the screen to seal at least one of the top portion and bottom portion of the screen. Alternatively, a gasket can be associated with both the top portion and the bottom portion of the screen.

The pair of parallel sidewall members of the backwash port forming the space for the fluid being filtered includes a leading edge and a trailing edge and the leading edge can be configured to form a slot with respect to the inner surface of the screen wherein the slot is approximately ⅛ inch.

The method further includes determining a height of the screen based upon the equation determining the area of draw of the backwash port so as to produce a flow rate of approximately 1.5-2% of the total amount of the fluid being filtered, wherein the fluid being filtered has a pipeline velocity of 10 ft/s. The method can also include providing a cleaning nozzle for directing a cleaning fluid to the inner surface of the screen for dislodging foreign material from the inner surface of the screen. The cleaning nozzle can be associated with the backwash port, so that the cleaning fluid and foreign material are directed to flow into the backwash port and exit out the discharge outlet.

In accordance with another aspect of the invention, a fluid strainer assembly utilizing approximately 1.5-2% of fluid having a pipeline velocity of 10 ft/s during a cleaning cycle includes a body defining a chamber, a screen positioned within the chamber and supported by the body through which a fluid being filtered must pass, the screen including an inlet and an outlet and having a screen slot size of approximately 25-812 microns, and a backwash port associated with an internal portion of the screen. The backwash port comprises a rectangular member having an axially extending port defined by a top wall, a bottom wall, and a pair of parallel sidewall members having end portions. The backwash port is movable about a central axis such that the end portions of the walls defining the backwash port are in a close spaced proximity relationship with respect to an inner surface of the screen defining a space for the fluid being filtered to flow between the end portions of the walls defining the backwash port and the cylindrical surface causing a tangential flow and a backwash flow of the fluid in order to dislodge and remove foreign material collected on the inner surface of the screen to flow into the backwash port and exit out a discharge outlet. The fluid strainer assembly includes a gear reducer for reducing a speed at which the backwash port rotates about the central axis at a ratio within the range of approximately 800:1 to 1500:1. The strainer assembly further includes at least one gasket on at least one of a top portion and a bottom portion of the screen. The backwash port is configured such that the area of draw is determined by the equation: i) CS×1.875×1.5≥A; and ii) A≥CS of backwash pipe, where CS represents the internal transverse area of the backwash pipe and A represents the area of draw of the port. The area of draw of the backwash port is defined as the leading edge area plus the screen open area that is being cleaned.

The fluid strainer assembly can further include a nozzle for directing a cleaning fluid to the inner surface of the screen for dislodging foreign material from the inner surface of the screen. The nozzle is associated with the backwash port so that the cleaning fluid and foreign material are directed to flow into the backwash port and exit out the discharge outlet.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 7A is a cross-sectional view taken along the plane 7A-7A of FIG. 5, illustrating the backwash port of FIGS. 5 and 6 in accordance with an embodiment of the present disclosure;

FIG. 7B is an exploded detail view B of FIG. 7A showing the trailing edge of the backwash port in accordance with an embodiment of the present disclosure;

FIG. 7C is an exploded detail view C of FIG. 7A showing the leading edge or accelerator plate of the backwash port in accordance with an embodiment of the present disclosure;

FIG. 8A is an expanded cross-sectional view showing the fluid strainer assembly including a gasket in accordance with an embodiment of the present disclosure;

FIG. 8B is the assembled fluid strainer assembly of FIG. 8A in accordance with an embodiment of the present disclosure;

FIG. 10A is a schematic top view of a screen showing the slots and wires of the screen, but wherein the strainer is oriented in a manner in which the slots are vertical, as opposed to their typical circumferential direction, in accordance with an embodiment of the present disclosure; and FIG. 10B is an exploded view of circle 10B in FIG. 10A showing the details of the slots and wire measurements in accordance with an embodiment of the present disclosure.

DESCRIPTION OF THE INVENTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

The fluid strainer assembly of the present invention is configured such that the amount of fluid exiting through the backwash port has a flow rate of approximately 2% or less than the total amount of fluid being filtered. According to one embodiment, the amount of fluid exiting through the backwash port can have a flow rate of approximately 1.5-2% of the total amount of fluid being filtered based upon a fluid flow rate of 10 ft/s.

Figure 1A:
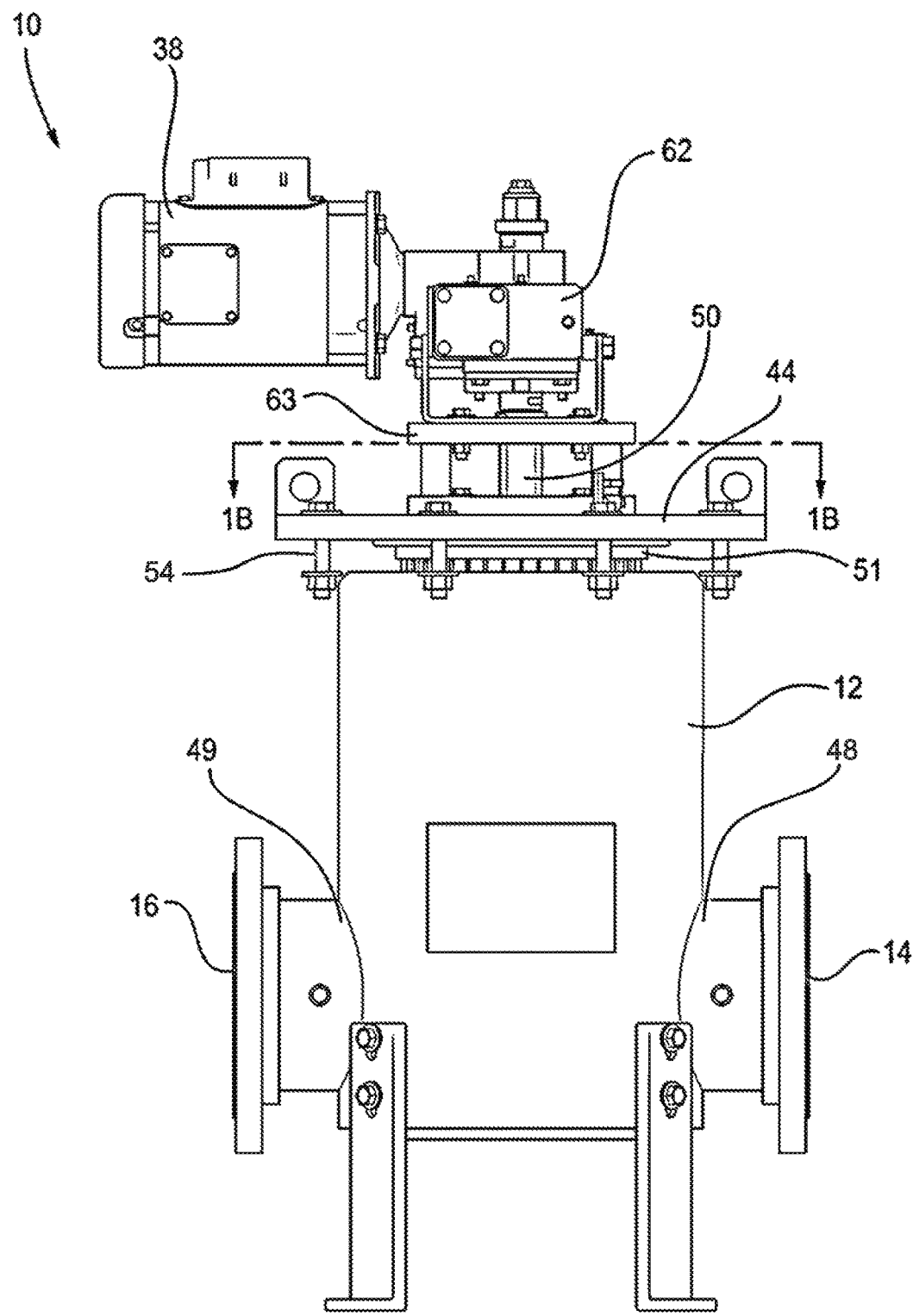
FIG. 1A is a perspective view of a fluid strainer assembly in accordance with an embodiment of the present disclosure.
Figure 1B:
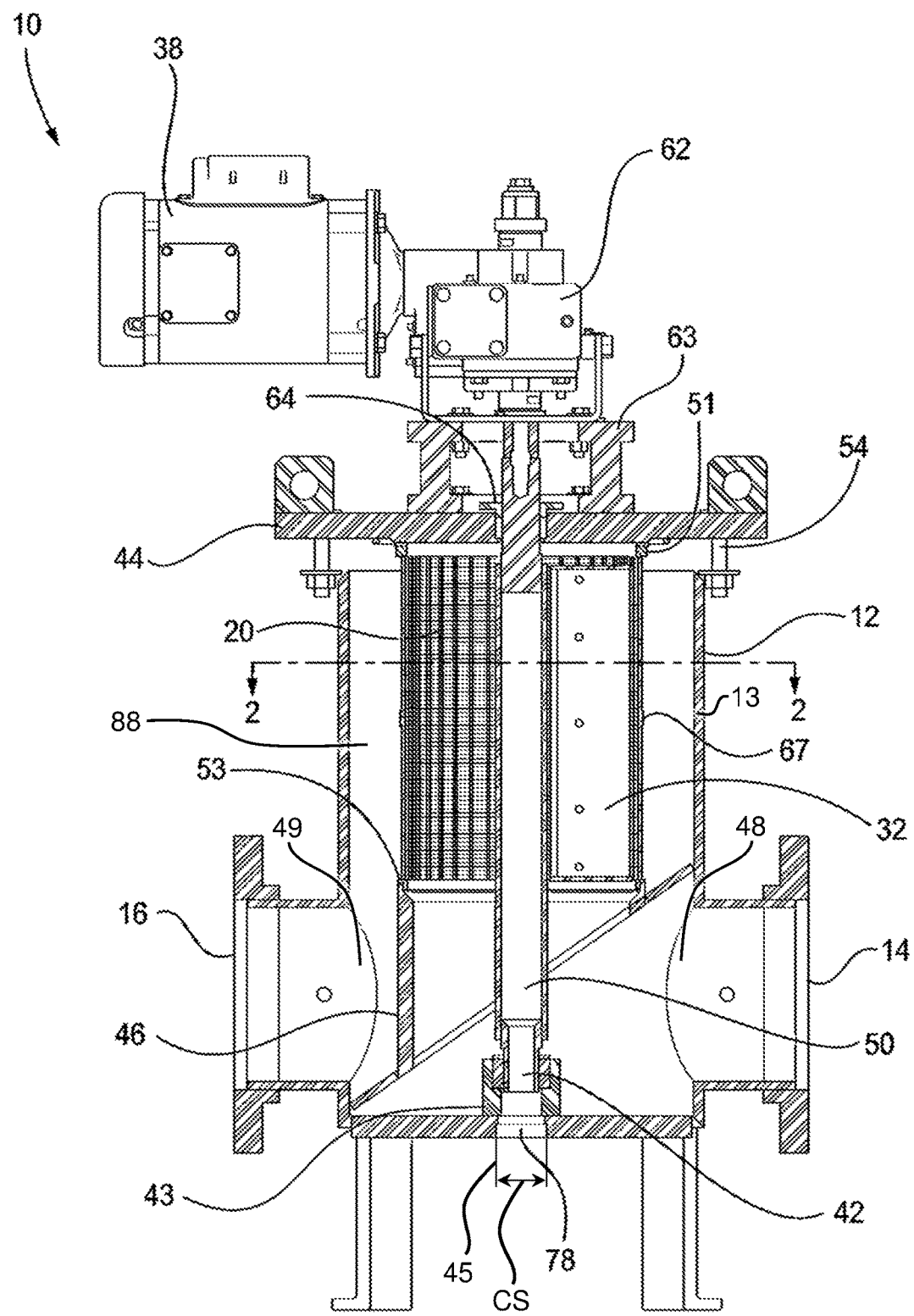
FIG. 1B is a longitudinal cross-sectional view taken along plane 1B-1B of FIG. 1A, illustrating a fluid strainer assembly made in accordance with an embodiment of the present disclosure.
Figure 2:
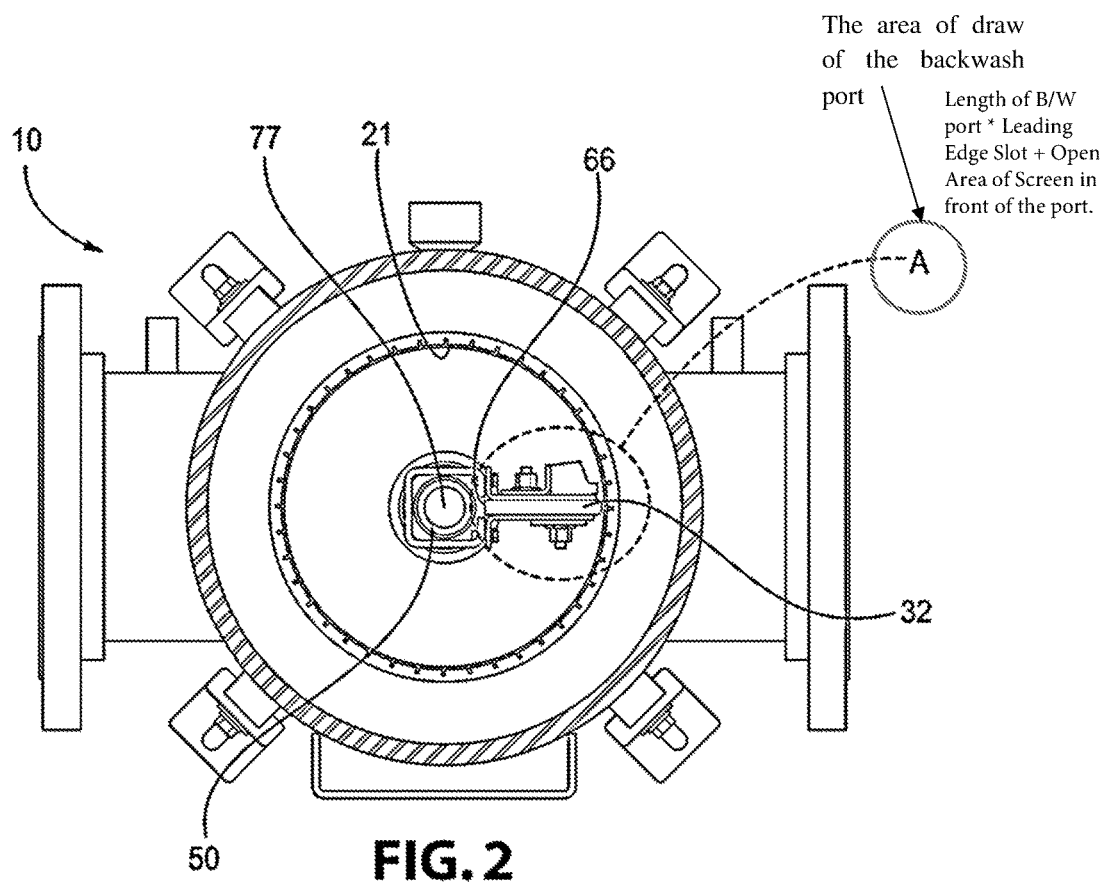
FIG. 2 is a cross-sectional view taken along line 2-2 of FIG. 1B illustrating a backwash arrangement made in accordance with an embodiment of the present disclosure.

Reference is now made to FIGS. 1A, 1B, and 2, which show a fluid strainer assembly, generally indicated as 10 in accordance with the invention. It is noted that FIG. 2 is a cross-sectional view of the fluid strainer assembly but wherein the cross-hatching of components within the screen has been removed to preserve detail. The fluid strainer assembly 10 includes a body 12, which may be a generally cylindrical body, having a strainer cover 44. A screen support ring 46 is provided to support the screen 20. Inlet tube 14 is connected through an opening 48 in the wall 13 of the body 12. Outlet tube 16 also extends through an opening 49 in the wall 13 of the body 12.

The screen 20 includes a hollow cylindrical configuration and is concentrically disposed inside the body 12 with a space 88 between an inner surface of the wall 13 of the body 12 and an outer surface of the screen 20. The screen 20 has an upper screen ring 51 on its upper end and a lower screen ring 53 that fits on the bottom of the screen 20.

A motor 38 and a gear reducer unit 62 is supported on a reducer mount 63 which is placed on the strainer cover 44. The gear reducer unit 62 includes a gear reduction unit or other suitable drive operatively connected to a hollow backwash shaft 50 and extending through a packing 64 into the interior of the screen 20.

Figure 3:
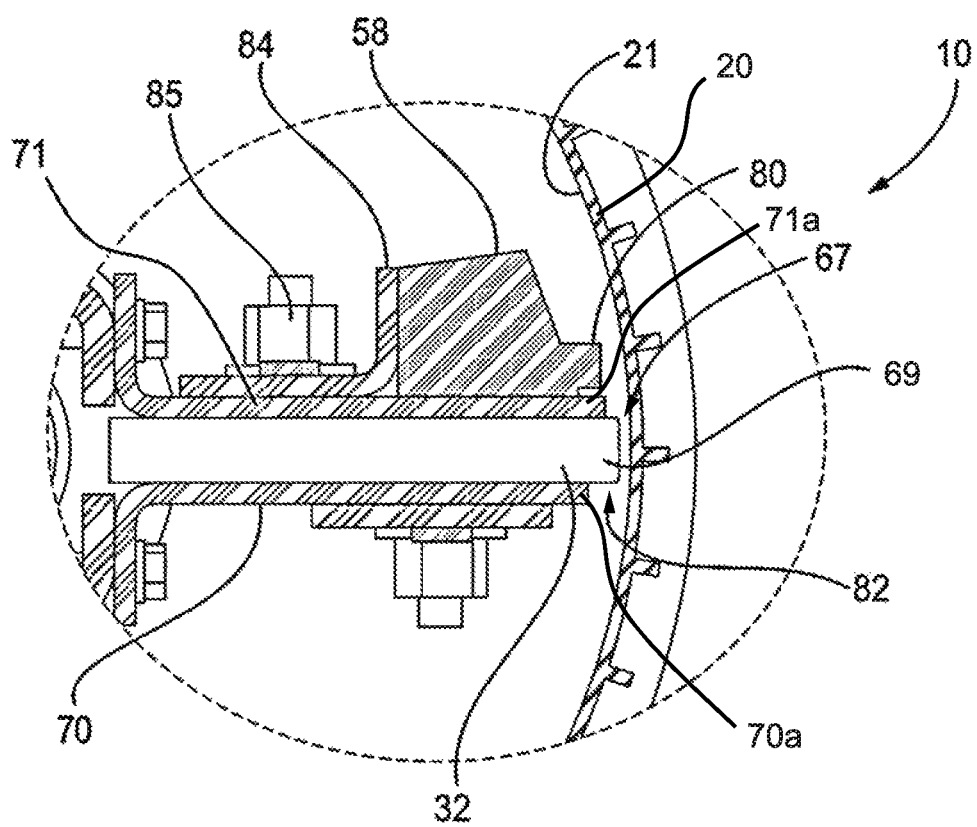
FIG. 3 is an exploded detail view A of FIG. 2 illustrating the backwash port in cooperation with the screen in accordance with an embodiment of the present disclosure.
Figure 5:
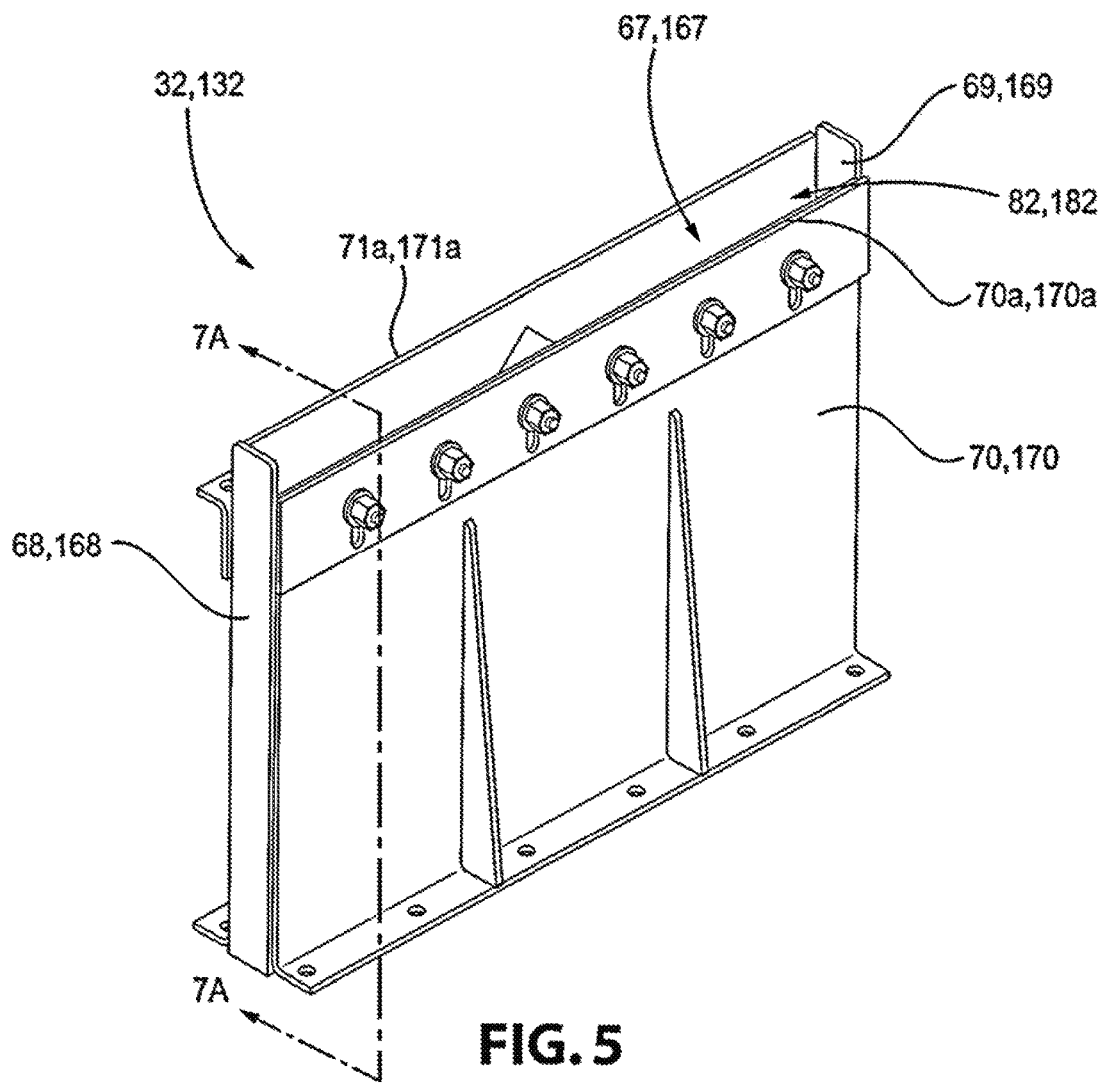
FIG. 5 is a side perspective view of the backwash port in accordance with an embodiment of the present disclosure.
Figure 6:
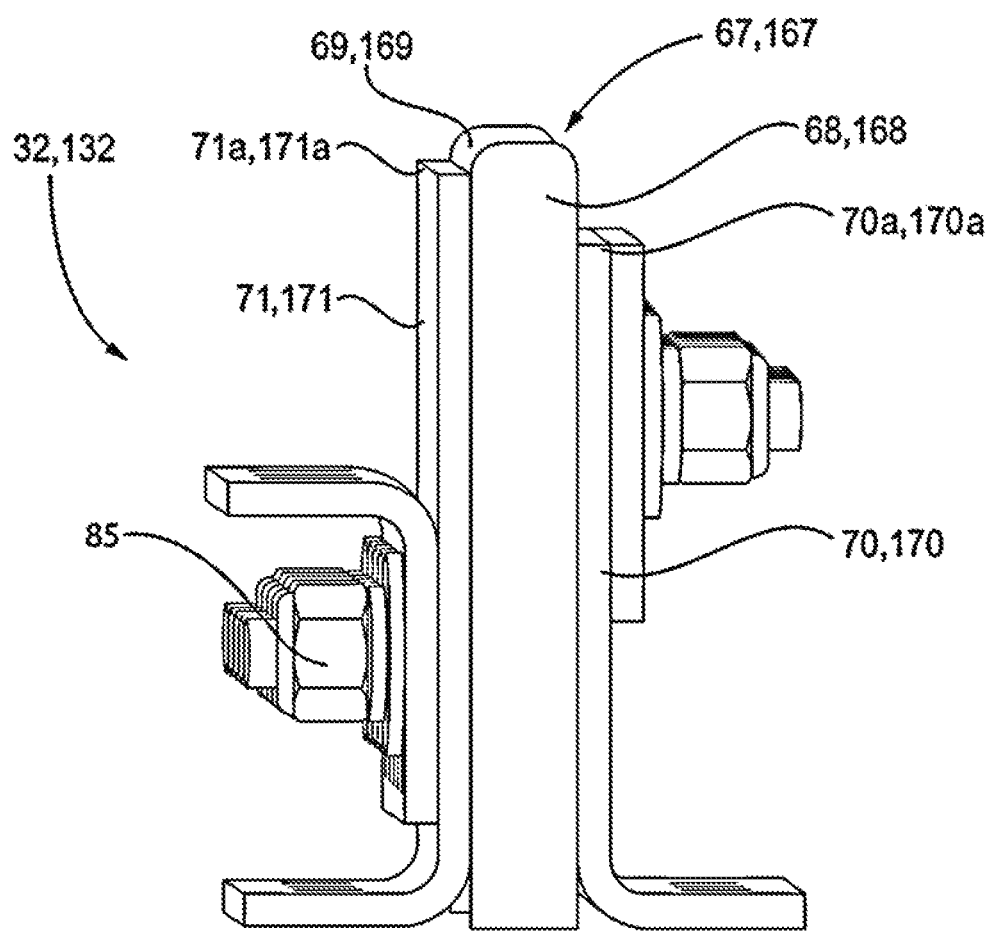
FIG. 6 is an end perspective view of the backwash port of FIG. 5 in accordance with an embodiment of the present disclosure.

With continuing reference to FIGS. 1A, 1B, and 2, and with further reference to FIG. 3, the hollow backwash shaft 50 may be square or round in cross-section and have a slot 66, which communicates with the inside of a backwash port 32. As shown in FIGS. 5-6, the backwash port 32 comprises a rectangular member having an axially extending portion 67 defined by a top wall 68, a bottom wall 69, and a pair of parallel sidewall members comprising a leading sidewall member 70 or accelerator plate and a trailing sidewall member 71. The leading and trailing sidewall members 70, 71 terminate in end portions 70a, 71a. These end portions 70a, 71a would be positioned adjacent to an inner wall surface 21 of the screen 20 of FIG. 3.

As shown in FIG. 1B, the lower end 42 of hollow backwash shaft 50 is received in a hollow bearing 43, which is supported on a backwash pipe 45 and communicates with the backwash pipe 45. The backwash shaft 50 is in fluid communication with backwash outlet 78, which may be connected to the backwash pipe 45 and/or a suitable drain.

With reference to FIG. 2, the rotating hollow shaft 50 has means supporting the hollow backwash port 32 on the strainer body 12, which enable rotation about a central axis of the screen 20. The hollow backwash port 32 extends outwardly from the hollow shaft 50. The backwash port 32 has a central axis 77 and terminates in close spaced relation to the inner surface or inner periphery 21 of the screen 20. End portion 71a of trailing sidewall member 71 terminates in close spaced relation to the inner surface 21 of the screen 20. The end portion 70a of leading sidewall member 70 terminates a distance away from the inner surface 21 of screen 20 to form a slot or opening 82 with respect to the inner surface 21 on the order of approximately ⅛ of an inch.

According to one design, as shown in FIG. 3, the trailing sidewall member 71 can include a port shoe 58, which is supported by a bracket 84, which is fixed to the trailing sidewall member 71 by means of a suitable fastener 85. The port shoe 58 can be formed from a brass material and can include a brush 80 which has a very small clearance with respect to the screen 20. The brush 80 can assist in the loosening of debris from the inner surface 21 of the screen 20.

In operation, dirty fluid or water enters into the fluid strainer assembly 10 through the inlet tube 14 and travels up toward the screen 20. The fluid passes through the screen 20 from inside the screen 20 to the outside, trapping debris on the inner surface 21 of the screen 20. A backwash sequence can be initiated by an adjustable timer in a control panel (not shown), associated with the fluid strainer assembly 10. The control panel energizes the motor 38, gear reducer unit 62, and a backwash control valve (not shown) to cause the backwash port 32 to rotate, moving slowly around the inside of the screen 20. When the backwash control valve opens, the difference between the high pressure inside the screen 20 and low pressure outside the screen 20 causes a suction effect at the point of cleaning. This suction effect allows the backwash port 32 to pull debris off the inner surface 21 of the screen 20 through axially extending portion 67 while rotating. The debris travels into the hollow shaft 50 and exits via a lower end 42 of the hollow backwash shaft 50, backwash outlet 78, and backwash pipe 45. The leading end portion 70a of the leading sidewall member 70 of the backwash port 32 terminates a distance away from the inner surface 21 of a screen, forming a slot or opening 82, allowing for a tangential flow and backflow. The tangential flow and backflow enables the use of dirty fluid inside the screen 20 and enables a portion of the fluid being strained to flow in a reverse direction from the space 88 back through the screen 20. It can be appreciated that if the strainer experiences a sudden high debris loading, a differential pressure switch can be activated. This switch measures the pressure between the inlet 14 and outlet 16 of the fluid strainer assembly 10. As the screen 20 becomes dirty, the inlet pressure will exceed the outlet pressure. As a result, a signal can be sent to the control panel to initiate a cleaning cycle.

Figure 4:
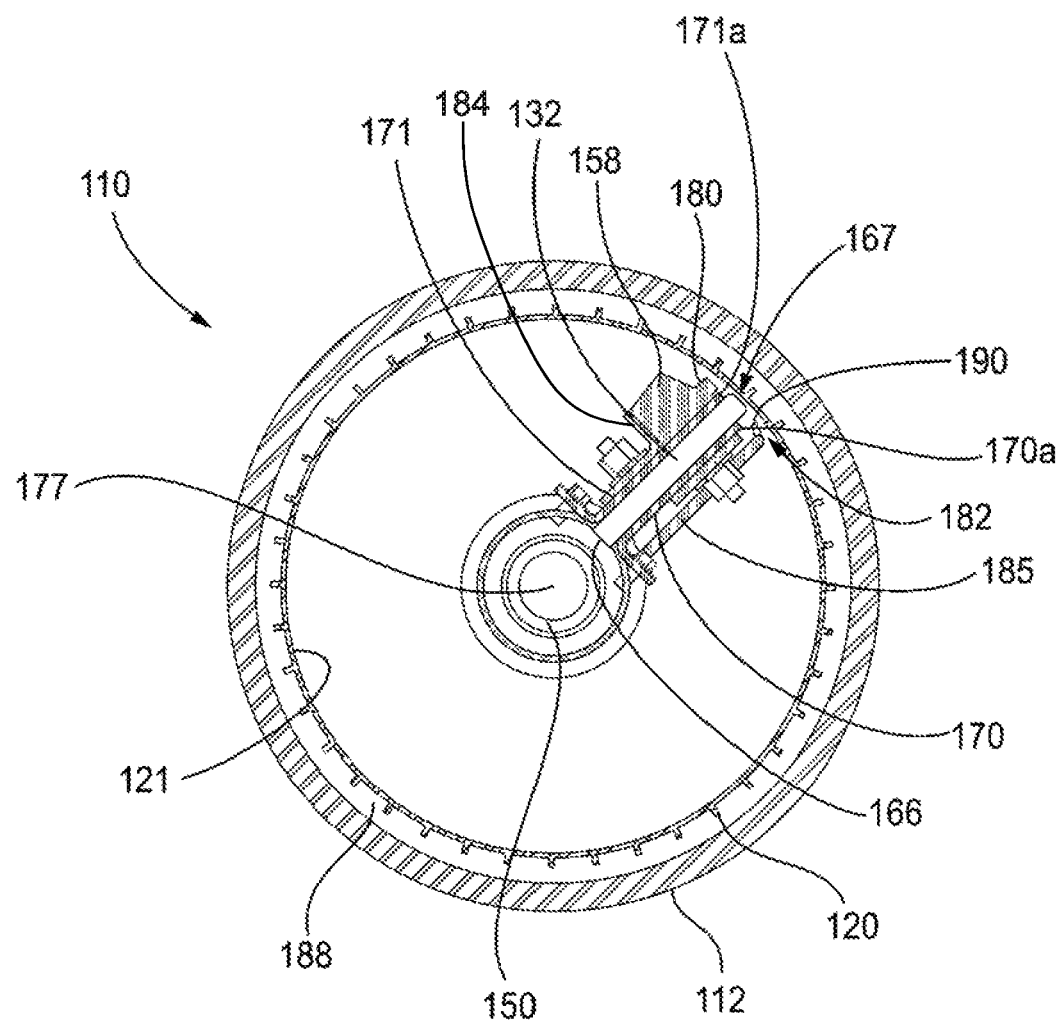
FIG. 4 is a top view of a backwash port including a cleaning nozzle in cooperation with a screen in accordance with an embodiment of the present disclosure.

Reference is now made to FIG. 4, which shows a fluid strainer assembly, generally indicated as 110, in accordance with another embodiment of the invention. The fluid strainer assembly 110 is similar to the fluid strainer assembly 10, as discussed above, except for the below-noted differences, particularly the nozzle assembly 185. A screen 120 is concentrically disposed inside a cylindrical body 112 whereby a space 188 is defined between an inner surface of the body 112 and an outer surface of the screen 120.

With continuing reference to FIG. 4, and with further reference to FIGS. 5-7, the strainer assembly 110 further includes a cleaning assembly, including a hollow backwash shaft 150 having a slot 166, which communicates with the inside of backwash port 132, positioned in the interior of the screen 120. The backwash shaft 150 is coaxial with the cylindrical screen 120 about a central axis 177. The backwash port 132, which collects cleaning fluid and particulate matter, extends radially outwardly from the shaft 150 and includes a rectangular member having an axially extending portion 167 defined by a top wall 168, a bottom wall 169, and a pair of parallel sidewall members or comprising a leading sidewall member or accelerator plate 170 and a trailing sidewall member 171 terminating in end portions 170a, 171a, which are positioned adjacent the inner wall surface 121 of the screen 120. The portion 167 communicates with the slot 166 in the shaft 150. The backwash port 132 rotates about the central axis 177. The end portion 170a of leading sidewall member 170 terminates a distance away from the inner surface 121 of the screen 120 to form a slot or opening 182 with respect to the inner surface 121 on the order of approximately ⅛ of an inch.

As shown in FIG. 4, the backwash port 132 can have a port shoe 158 for scraping particulate matter from the inner surface 121 of the screen 120. According to one embodiment, the port shoe 158 can be formed from brass. A brush 180 can be used in addition to the port shoe 158 to assist in dislodging particulate material from the inner surface 121 of the screen 120. The port shoe 158 is supported on plate 171 by a bracket 184.

The cleaning assembly further includes a cleaning fluid inlet tube associated with a nozzle assembly 185. A plurality or array of nozzles 190 are mounted to the nozzle assembly 185. The nozzles 190 extend along the longitudinal length of the backwash port 132 and direct cleaning fluid to the inner surface 121 of the screen 120 for dislodging particulate matter from the inside of the screen 120. Any number of nozzles 190 may be used. The nozzles 190 may have an internal diameter of approximately 3/32 to ¼ inch. The function of the nozzles 190 is to direct cleaning fluid toward the inner surface 121 of the screen 120 to convert the high pressure cleaning fluid entering the inlet tube into high velocity cleaning fluid exiting the nozzles 190 at nozzle tips. The exiting of the cleaning fluid is a function of the incoming fluid pressure, which should be on the order of approximately 20-40 psig higher than the operating pressure, and the number and spacing of the nozzles 190, which can be determined on a case by case basis. Specifically, the nozzle tips are positioned adjacent the backwash port leading end 170a, facing in the direction of the backwash port 132 and adjacent to and in close proximity to the inner surface 121 of the screen 120 at approximately several inches or less, typically less than ½ inch.

Preferably, the nozzle tip is positioned adjacent to and in close proximity to both the inner surface 121 of the screen 120 and the axially extending open portion 167 of the backwash port 132 so that cleaning fluid exiting from the nozzle tip contacts the inner surface 121 of the screen 120 dislodging particulate matter which enters the slot 182 and portion 167 of the backwash port 132. According to one embodiment, the nozzles 190 discharge cleaning fluid at an acute incident angle, such as 45 degrees, with respect to the tangent to the inner surface 121 of the screen 120 at the point of contact of the directed cleaning fluid. The nozzles can be positioned at approximately a 45 degree angle with respect to the tangent of the cleaning fluid point of contact with respect to the inlet surface 121 of the strainer.

During a cleaning cycle, the backwash port 132 is activated such that it begins to rotate about the central axis 177 and pressurized cleaning fluid, such as water, from an external source enters the inlet tube and exits through the plurality of nozzles 190 at the acute incident angle with respect to the tangent of the screen 120. The pressurized cleaning fluid is maintained at a pressure greater than that of the fluid flowing through the chamber. The exiting cleaning fluid then deflects off of the inner surface 121 of the screen 120 with dislodged particulate matter, and, as a result of a differential pressure buildup in the screen 120, the fluid flows into the backwash port 132 through the portion 167. In addition to the exiting cleaning fluid, fluid within the fluid strainer assembly 110 will also flow through the backwash port 132. The dislodged particulate matter then flows through the backwash shaft 150 and into a collection pipe or backwash pipe 45.

According to one embodiment, the collection pipe enters into a sump maintained at atmospheric pressure. The pressure differential between the fluid passing through the screen 120 and discharge causes the fluid and particulate matter to flow from the backwash port 132 to the sump. The motor and gear reducer unit (not shown), when activated, rotates or moves the backwash port 132 and nozzles 190 in concert with each other and relative to the screen 120, which permits the complete fluid strainer assembly 110 to be cleaned. It can be appreciated that it is possible to keep the backwash port 132 and nozzles 190 stationary and rotate the screen 120. The cleaning cycle can occur on a set schedule and/or can be activated when a build-up of particulate material on the inlet side of the screen 120 causes the pressure within the screen 120 to exceed the pressure in the space 188 between the outer surface of the screen 120 and the cylindrical body 112.

As stated above, the fluid strainer assemblies 10, 110 are configured, such that the amount of fluid exiting through the backwash port 32, 132 has a flow rate of approximately 2% or less than the total amount of fluid being filtered. According to one embodiment, the amount of fluid exiting through the backwash port 32, 132 can have a flow rate of approximately 1.5-2% of the total amount of fluid being filtered with a pipeline velocity of 10 ft/s.

The reduction in the flow rate of the fluid can be caused by several components of the fluid strainer assembly 10, 110. One of the main factors affecting the flow rate of the cleaning fluid exiting the fluid strainer assembly 10, 110 is the size of the backwash port 32, 132. According to the present invention, in order to reduce the amount of cleaning fluid exiting the screen 20, 120 is to design or configure the backwash port 32, 132 such that the area of draw is determined by the equation:

i) $CS \times 1.875 \times 1.5 \geq A$; and ii) $A \geq CS$ of backwash pipe, where: CS represents the internal transverse area of the backwash pipe and A represents the area of draw of the backwash port. The area of draw of the backwash port is defined as the leading edge area plus the screen open area that is being cleaned.

To follow, are three non-limiting examples using a 4" strainer; a 6" strainer; and a 12" strainer, wherein 4", 6", and 12" refers to the size of the inlet 14, 114 and outlet 16, 116 ports of the strainers. To assist in understanding the examples, reference is made to FIGS. 10A and 10B, which illustrate a slot size 90 and a wire width or wire size 92 of the screen 20 referred to in Examples 1-3. For purposes of illustration, the screen 20 is oriented in a manner in which the slots are shown in a vertical direction, however, typical use within the strainer assembly 10, the slots are arranged in a circumferential direction with respect to the central axis 77, 177 extending through the strainer assembly 10, 110. It can be appreciated that the slot size 90 and wire width 92 can vary depending upon the particular material being filtered, the desired degree of filtration, and the like. Reference is also made to FIG. 1B, which shows the inside diameter D of the backwash pipe 45. This value is used to calculate the internal transverse area CS of the backwash pipe according to the formula set forth below in the examples.

Example 1

The value for the B/W pipe inside diameter is a given value dependent upon the particular strainer assembly being used. The values for the length of the backwash (B/W) port, the width of the B/W port (inside), the size of the slot and size of the wire are variable values which are combined together to meet the criteria of the Total Area to draw water in the port "A" in accordance with the given equation. The width of the B/W port (outside) is determined based on the width of the B/W port (inside) and the gage used to form the top, bottom, and sidewalls of the backwash port 32, 132. The leading edge slot of 0.125 inch (⅛ inch) has been determined in the present invention to produce optimal results. The open area of screen in front of the port, with reference to FIGS. 10A and 10B, assumes a particular slot and wire size as set forth in the table and is calculated by the formula set forth below.

Formula for "*Open Area to draw water into the port" is—(Length of *B/W* port*Width of *B/W* port(inside))*(Slot/(Slot+Wire Size))

Formula for "Total Area to draw water into port" is—Length of *B/W* port*Leading edge Slot+ Open Area of Screen in front of the port Formula for "Has to be<" is—Length of *B/W* port*Width of *B/W* port(inside)

Formula for next "Has to be<" is—CS of the *B/W* pipe*1.875*1.5

Formula for "CS of the *B/W* pipe" is—$\pi$*(*B/W* pipe inside diameter)$^2$/4

These above formulas are also used in Examples 2 and 3.

Example 2

|  | 4" Strainer |  |  |  |  |
|---|---|---|---|---|---|
| Length of B/W port = | 6 | in |  |  |  |
| Width of B/W port (outside) = | 0.4375 | in |  |  |  |
| Leading edge Slot = | 0.125 | in |  |  |  |
| Width of B/W port (inside) = | 0.198 | in |  |  |  |
| *Open Area of Screen in front of the port = | 0.414 | in^2 |  |  |  |
| Total Area to draw water into port = | 1.164 | in^2 | Has to be < | 1.190 in^2 |  |
| Has to be < | 1.500 in^2 |  | and be > | 0.533 in^2 |  |
| *Assumes the following slot and wire size | 0.016 | in Slot | 0.030 | in Wire Size |  |
| B/W pipe inside diameter = | 0.824 | in |  |  |  |
| CS of the B/W pipe = | 0.533 | in^2 |  |  |  |

|  | 6" Strainer |  |  |  |  |
|---|---|---|---|---|---|
| Length of B/W port = | 11 | in |  |  |  |
| Width of B/W port (outside) = | 0.4375 | in |  |  |  |
| Leading edge Slot = | 0.125 | in |  |  |  |
| Width of B/W port (inside) = | 0.198 | in |  |  |  |
| *Open Area of Screen in front of the port = | 0.759 | in^2 |  |  |  |
| Total Area to draw water into port = | 2.134 has to be | in^2 | 2.181 | in^2 |  |
| Has to be < | 2.431 | in^2 | and be > | 0.864 | in^2 |
| *Assumes the following slot and wire size | 0.016 | in Slot | 0.030 | in Wire Size |  |
| B/W pipe inside diameter = | 1.049 | in |  |  |  |
| CS of the B/W pipe = | 0.864 | in^2 |  |  |  |

Example 3

| | 12" Strainer | |
|---|---|---|
| Length of B/W port = | 15 | in |
| Width of B/W port (outside) = | 0.5 | in |
| Leading edge Slot = | 0.125 | in |
| Width of B/W port (inside) = | 0.261 | in |
| *Open Area of Screen in front of the port = | 1.361 | $in^2$ |
| Total Area to draw water into port = | has to be < 3.236 $in^2$ has to be < 3.912 $in^2$ has to be < 5.726 $in^2$ and be > 2.036 $in^2$ | |
| *Assumes the following slot and wire size | 0.016 in Slot | 0.030 in Wire Size |
| B/W pipe inside diameter = | 1.61 | in |
| CS of the B/W pipe = | 2.036 | $in^2$ |

According to this equation, the backwash port 32, 132 can be configured to produce a flow rate of approximately 1.5-2% of the total amount of fluid being filtered wherein the fluid being filtered has a pipeline velocity of 10 ft/s. A height of the screen 20, 120 can also be determined based on the above equation so as to produce the desired 1.5-2% fluid flow rate at the pipeline velocity of 10 ft/s. Other components of the fluid strainer assembly which affect the flow rate or which can be achieved through modification of the port 32, 132 include the ability to use a smaller screen slot size for the screen 20, 120, such as to use a screen slot size of approximately 25-812 microns. The speed at which the backwash port 32, 132 rotates can also affect the flow rate of the fluid exiting through the backwash port 32, 132. As shown in FIGS. 1A and 1B, the fluid strainer assembly 10 can include a gear reducer unit 62 for reducing a speed at which the backwash port 32, 132 rotates about the central axis 77, 177. According to one example, the gear reducer ratio can range from 800:1 to 1500:1. This reduction of the rotational speed of the backwash port 32, 132 can result in the backwash port rotating at a speed of approximately 1.15 revolutions per minute (RPM) such that the backwash port rotates at a rate of 1-2 revolutions about the inner surface of the screen per minute instead of the typical rotation of 4 revolutions per 2 minutes.

Reference is now made to FIGS. 8A and 8B, which are directed to a gasket 95 and removal and replacement of a straining element 20 and the positioning of the gasket 95 with respect to the screen 20 which can be used with either of the fluid strainer assemblies 10, 110 discussed above and shown in FIGS. 1-4. The gasket 95 can be associated with at least one of a top portion and/or upper screen ring 51 and a bottom portion and/or bottom screen ring 53 of the screen 20. It can be appreciated that one or more gaskets 95 may be associated with the top, the bottom, or both the top and bottom of the screen 20. As shown in FIGS. 8A and 8B, a cover 44 can be positioned adjacent to the gasket 95 and secured onto the strainer body 12 by any other well-known securing members.

Figure 9A:
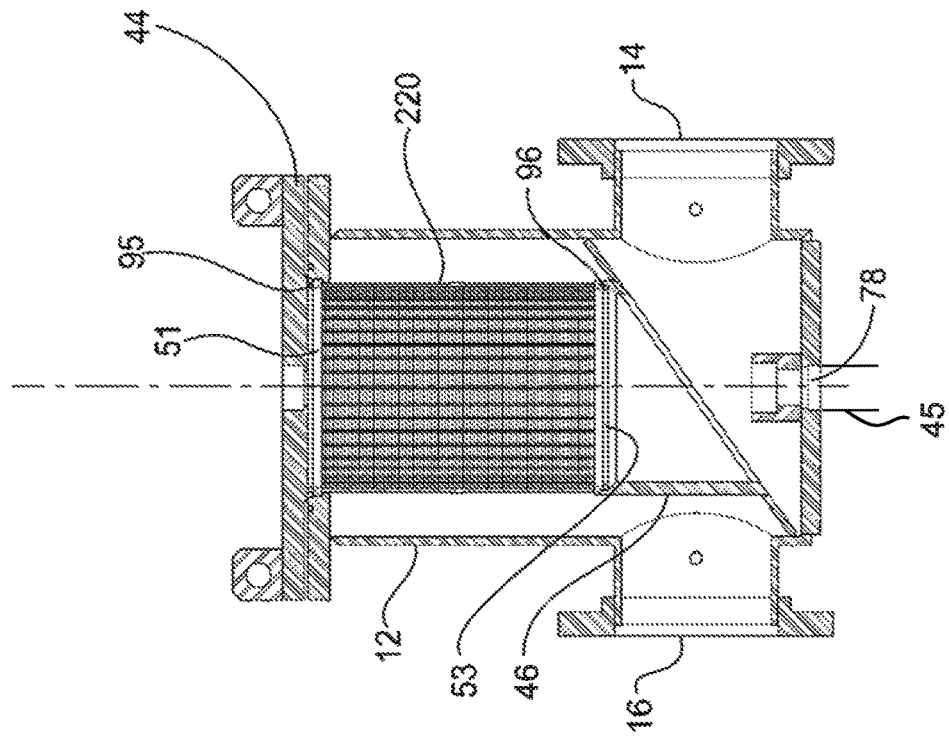
FIG. 9A is an expanded cross-sectional view showing the fluid strainer assembly including a pair of gaskets in accordance with an embodiment of the present disclosure.
Figure 9B:
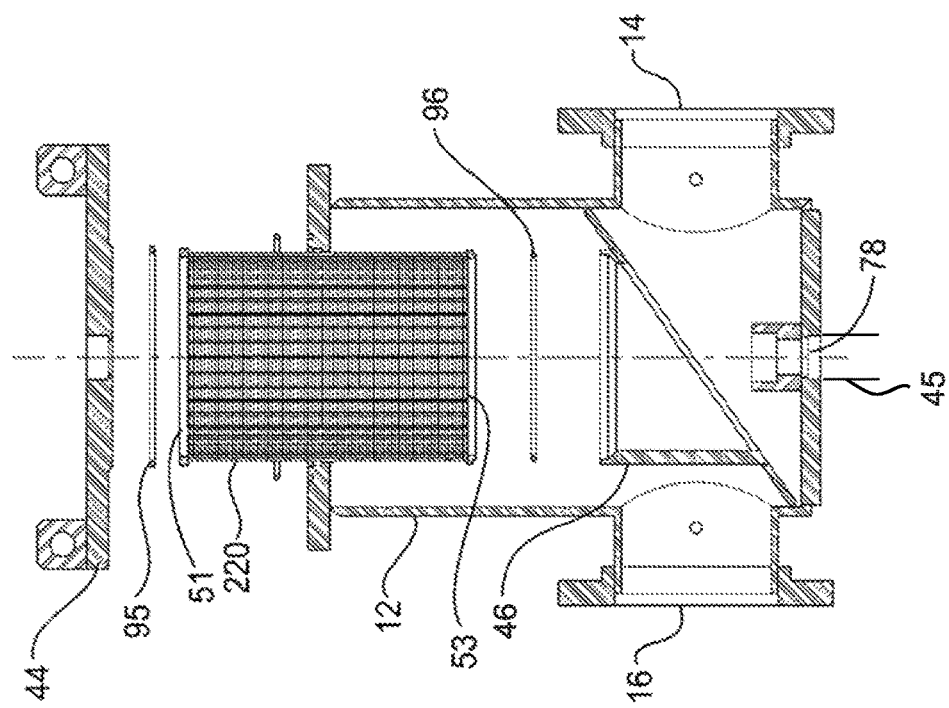
FIG. 9B is the assembled fluid strainer assembly of FIG. 9A in accordance with an embodiment of the present disclosure.

FIGS. 9A and 9B are directed to a fluid strainer assembly 10 including a pair of gaskets 95, 96. Gasket 95 is associated with the top portion of the straining element 220 and/or with upper screen ring 51 and gasket 96 is associated with the bottom portion of the straining element 220 and/or with the bottom screen ring 53.

While embodiments of self-cleaning strainer assemblies which use a reduced amount of water during a backwash cleaning process are provided in the foregoing description, those skilled in the art may make modifications and alterations to these embodiments without departing from the scope and spirit of the invention. Accordingly, the foregoing description is intended to be illustrative rather than restrictive.

The invention claimed is:

1. A fluid strainer assembly comprising:
   a body defining a chamber;
   an inlet and outlet connected with the body;
   a cylindrical screen positioned within the chamber and supported by the body through which a fluid being filtered must pass, said cylindrical screen defining an internal portion; and
   a backwash port located within the internal portion of the screen, said backwash port being in fluid communication with a backwash pipe for directing fluid out of the fluid strainer assembly during a cleaning cycle, said backwash port comprising a rectangular member having an axially extending port defined by a top wall, a bottom wall, and a pair of parallel sidewall members, said top wall, bottom wall, and sidewall members having end portions, said backwash port being movable about a central axis such that said end portions are in a close spaced proximity relationship with respect to an inner surface of said screen defining a space for the fluid being filtered to flow between said end portions and said inner surface of said screen causing a tangential flow and backflow of the fluid in order to dislodge and remove foreign material collected on the inner surface of the screen to flow into the backwash port and exit out a discharge outlet and the backwash pipe wherein the backwash port is dimensioned such that an area of draw is determined by equations: i) CS×1.875× 1.5≥A; and ii) A≥CS of backwash pipe, where CS represents an internal transverse area of the backwash pipe and A represents the area of draw of the backwash port.

2. The fluid strainer assembly of claim 1, wherein an amount of fluid exiting through the backwash port is determined by a configuration of the backwash port according to the equation and wherein the backwash port is dimensioned to allow a flow rate of approximately 1.5-2% of a total amount of the fluid being filtered wherein the fluid being filtered has a pipeline velocity of 10 ft/s.

3. The fluid strainer assembly of claim 2, wherein a design of the backwash port is determined based upon the equation determining the area of draw of the backwash port so as to allow the flow rate of approximately 1.5-2% of the total amount of the fluid being filtered wherein the fluid being filtered has a pipeline velocity of 10 ft/s.

4. The fluid strainer assembly of claim 1, wherein the screen has a screen slot size of approximately 25-812 microns.

5. The fluid strainer assembly of claim 1, wherein the backwash port includes a gear reducer for reducing a speed at which the backwash port rotates about the central axis to within a ratio of 800:1 to 1500:1.

6. The fluid strainer assembly of claim 1, wherein the backwash port rotates at a rate of approximately 1-2 revolutions about the inner surface of the screen per minute.

7. The fluid strainer assembly of claim 1, wherein the pair of parallel sidewall members forming the space for the fluid being filtered comprises a leading edge and a trailing edge and wherein the leading edge forms a slot with respect to the inner surface of the screen and wherein the slot is approximately ⅛ inch.

8. The fluid strainer assembly of claim 7, wherein the area of draw of the backwash port is defined as an area of the leading edge and an open area of the screen being cleaned.

9. The fluid strainer assembly of claim 1, including at least one gasket located adjacent to at least one of a top portion and a bottom portion of the screen to seal at least one of the top portion and bottom portion of the screen.

10. The fluid strainer assembly of claim 9, including a pair of gaskets, wherein one gasket is located adjacent to the top portion of the screen and another gasket is located adjacent to the bottom portion of the screen.

11. The fluid strainer assembly of claim 1, including a cleaning nozzle for directing a cleaning fluid to the inner surface of the screen for dislodging foreign material from the inner surface of the screen, said cleaning nozzle being located with respect to the backwash port so that the cleaning fluid and foreign material are directed to flow into the backwash port and exit out the discharge outlet.

12. A method of reducing an amount of fluid used during a cleaning cycle of fluid strainer assembly, said method including:
providing a body defining a chamber, the body including an inlet and outlet;
positioning a cylindrical screen within the chamber, said screen being supported by the body through which a fluid being filtered must pass, said cylindrical screen defining an internal portion;
positioning a backwash port within the internal portion of the screen, said backwash port being in fluid communication with a backwash pipe for directing fluid out of the fluid strainer assembly during a cleaning cycle, said backwash port comprising a rectangular member having an axially extending port defined by a top wall, a bottom wall, and a pair of parallel sidewall members, said top wall, bottom wall, and pair of sidewall members having end portions;
supplying the fluid to be filtered into the chamber;
rotating said backwash port about a central axis such that said end portions are in a close spaced proximity relationship with respect to an inner surface of said screen defining a space for the fluid being filtered to flow between said end portions and said inner surface of said screen causing a tangential flow and backflow of the fluid in order to dislodge and remove foreign material collected on the inner surface of the screen to flow into the backwash port and exit out a discharge outlet and backwash pipe; and
dimensioning the backwash port such that an area of draw is determined by equations: i) $CS \times 1.875 \times 1.5 \geq A$; and ii) $A \geq CS$ of backwash pipe, where CS represents an internal transverse area of the backwash pipe and A represents the area of draw of the backwash port.

13. The method of claim 12, wherein a speed at which the backwash port is rotated and a size of the axially extending port of the backwash port are dimensioned such that an amount of fluid exiting through the backwash port has a flow rate of approximately 1.5-2% of a total amount of the fluid being filtered wherein the fluid being filtered has a pipeline velocity of 10 ft/s.

14. The method of claim 12, including providing a screen having a screen slot size of approximately 25-812 microns.

15. The method of claim 12, including rotating the backwash port at a speed of approximately 800:1 to 1500:1 and at a rate of approximately 1-2 revolutions about the inner surface of the screen per minute.

16. The method of claim 12, including positioning at least one gasket adjacent to at least one of a top portion and a bottom portion of the screen to seal at least one of the top portion and the bottom portion of the screen.

17. The fluid strainer assembly of claim 16, including a pair of gaskets, wherein one gasket is positioned adjacent to the top portion of the screen and another gasket is positioned adjacent to the bottom portion of the screen.

18. The method of claim 12, wherein the pair of parallel sidewall members forming the space for the fluid being filtered comprises a leading edge and a trailing edge and wherein the leading edge forms a slot with respect to the inner surface of the screen and wherein the slot is approximately ⅛ inch.

19. The method of claim 18, wherein the area of draw of the backwash port is defined as an area of the leading edge and an open area of the screen being cleaned.

20. The method of claim 12, comprising determining a design of the backwash port based upon the equation determining the area of draw of the backwash port so as to allow a flow rate of approximately 1.5-2% of a total amount of the fluid being filtered, wherein the fluid being filtered has a pipeline velocity of 10 ft/s.

21. The method of claim 12, comprising providing a nozzle for directing a cleaning fluid to the inner surface of the screen for dislodging foreign material from the inner surface of the screen, said nozzle being positioned with respect to the backwash port so that the cleaning fluid and foreign material are directed to flow into the backwash port and exit out the discharge outlet.

22. A fluid strainer assembly utilizing approximately 1.5-2% of total fluid being filtered during a cleaning cycle, said fluid strainer assembly comprising:
a body defining a chamber, the body including an inlet and outlet;
a cylindrical screen positioned within the chamber and supported by the body through which a fluid being filtered must pass, the screen having a screen slot size of approximately 25-812 microns, said cylindrical screen defining an internal portion;
a backwash port located within the internal portion of the screen, said backwash port being in fluid communication with a backwash pipe for directing fluid out of the fluid strainer assembly during a cleaning cycle, said backwash port comprising a rectangular member having an axially extending port defined by a top wall, a bottom wall, and a pair of parallel sidewall members, said top wall, bottom wall, and pair of sidewall members having end portions, said backwash port being movable about a central axis such that said end portions are in a close spaced proximity relationship with respect to an inner surface of said screen defining a space for the fluid being filtered to flow between said end portions and said inner surface of said screen causing a tangential flow and backflow of the fluid in order to dislodge and remove foreign material collected on the inner surface of the screen to flow into the backwash port and exit out a discharge outlet and backwash pipe;

a gear reducer for reducing a speed at which the backwash port rotates about the central axis at a ratio within the range of approximately 800:1 to 1500:1; and at least one gasket on at least one of a top portion and a bottom portion of the screen, wherein the backwash port is dimensioned such that an area of draw is determined by equations: i) $CS \times 1.875 \times 1.5 \geq A$; and ii) $A \geq CS$ of backwash pipe, where CS represents an internal transverse area of the backwash pipe and A represents the area of draw of the backwash port.

23. The fluid strainer assembly of claim 22, including a nozzle for directing a cleaning fluid to the inner surface of the screen for dislodging the foreign material from the inner surface of the screen, said nozzle being positioned with respect to the backwash port so that the cleaning fluid and the foreign material are directed to flow into the backwash port and exit out the discharge outlet.

* * * * *